Figure 1:
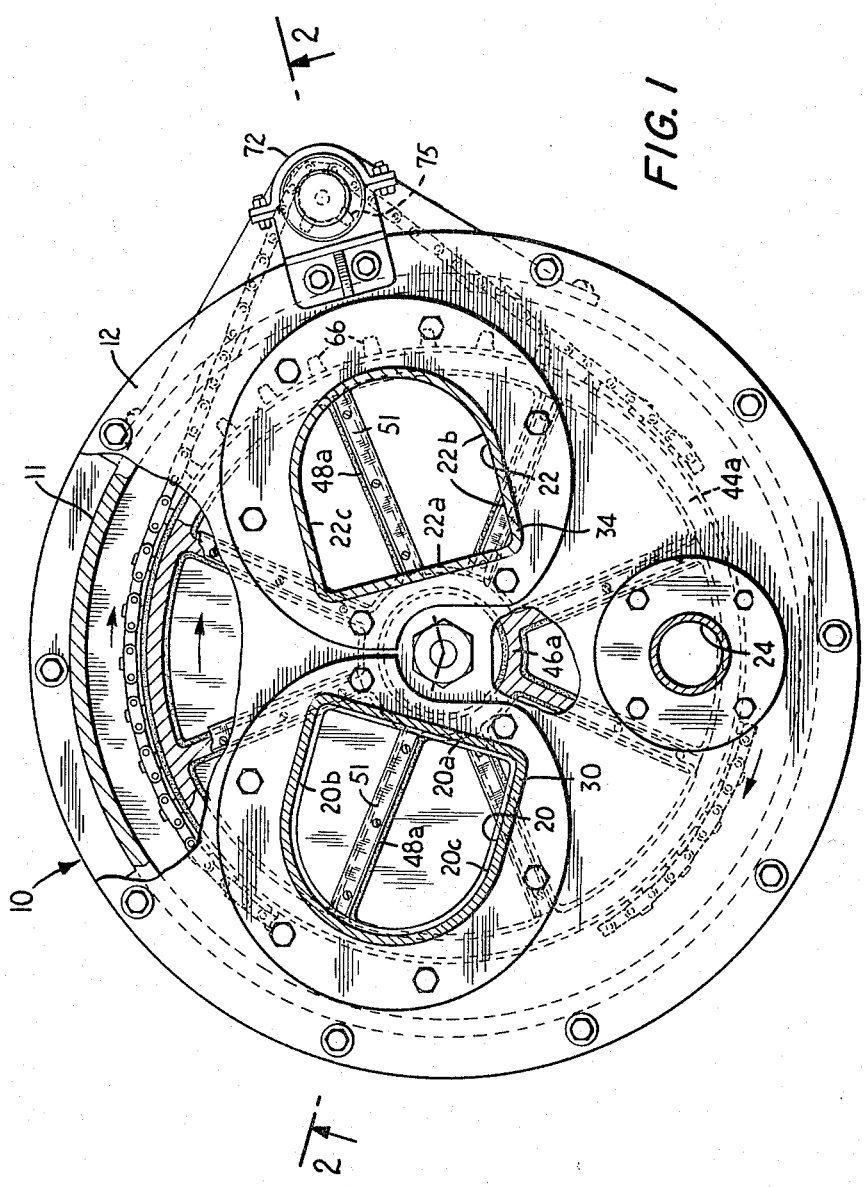

Nov. 8, 1966    L. E. MYLTING    3,284,139
ROTARY FEEDER

Filed March 8, 1965    2 Sheets-Sheet 1

INVENTOR.
LAURITZ E. MYLTING
BY
Brumbaugh, Free, Graves & Donohue
his ATTORNEYS

INVENTOR.
LAURITZ E. MYLTING
BY
Brumbaugh, Free, Graves & Donohue
his ATTORNEYS

United States Patent Office 3,284,139
Patented Nov. 8, 1966

3,284,139
ROTARY FEEDER
Lauritz E. Mylting, Ardmore, Pa., assignor to Buell Engineering Company, Inc., Lebanon, Pa., a corporation of Delaware
Filed Mar. 8, 1965, Ser. No. 437,981
13 Claims. (Cl. 302—49)

This invention relates to rotary feeders and, more particularly, to a novel and improved rotary feeder for introducing granular material from a hopper or the like into a flow of a gas or liquid conveying medium.

One type of feeder for granular material comprising a housing and a rotor carried in the housing having a plurality of material-receiving pockets which receive material at one point and discharge the material at another point into a flow of a gas or liquid. Some rotary feeders of this type are subject to a number of operating difficulties. For one thing, the granular material is often trapped between the edges of the rotor pockets and the downstream edge of a material supply opening in the rotor housing, and the rotor, accordingly, must be driven with sufficiently high power and the edges of the rotor pockets and of the material supply opening must be made of sufficiently durable material to enable them to cut or shear the granular material.

Generally, a considerable amount of power is needed to shear any material trapped at the downstream edge of the material supply opening as each of the rotor edges approaches it.

Another difficulty encountered with some rotary feeders is that the interfaces between the rotor and the housing, which serve as seals against communication of pressure between the material supply hopper and the conveying fluid, are quickly worn by frictional engagement between the surfaces supplemented by the abrasive action of particles of the material which intrude between the surfaces. As the interfaces between the rotor and housing wear, the sealing function is substantially impaired and further intrusion of material into the gap can take place, thus accelerating the wear. In conventional feeders, frequent replacement and repair of the rotor and housing members is common.

One proposal for overcoming the difficulties of rotor and housing wear is to form the rotor in two sections and to spring-load the sections away from each other toward the wall members of the housing. The problem with this solution is that any material which enters the spaces between the rotor and the housing wall member acts against the spring and forces the adjacent section inwardly. Additional material can then more readily intrude, and thus the sections are, in a very short period of time, pushed together against the resilient means and the seals provided at the interfaces are completely destroyed.

The foregoing and other disadvantages of presently known rotary feeders are overcome, in accordance with the invention, by a novel and improved rotary feeder comprising a housing and a rotor mounted in the housing and having surfaces engaging oppositely disposed wall members of the housing. A conveying fluid inlet opening and a discharge opening are provided in the respective wall members, and one of the wall members is provided with a material supply opening. The rotor includes a peripheral wall element and a plurality of radial wall elements which define material-receiving pockets in the rotor. Upon rotation of the rotor, each of the pockets is moved along a path which brings it into communication first with the material supply opening and then with the conveying fluid inlet opening and the discharge opening.

An important feature of the rotary feeder of the invention is that the leading edges of the radial elements defining the rotor pockets, and the downstream edge, with respect to the direction of rotation of the rotor, of the housing material supply opening, are arranged relative to and are cooperative with each other to urge any material engaged between them generally inwardly so that it is cut at an inwardly disposed region of the rotor. To this end, the downstream edge of the material supply opening is of a geometric form and located such that each of the leading edges of the radial elements of the rotor intersect it at substantially all of the infinite succession of points defining it at acute, inwardly-opening angles. Thus, as each of the radial elements of the rotor passes across the downstream edge of the material supply opening, any material caught between the rotor elements and that edge of the opening tends to be forced inwardly and to be cut at an inner region of the rotor. As the leading edges of the radial elements of the rotor pass the downstream edge of the opening, some of the material will simply be cut off without moving any substantial distance along the edges, the cutting action being scissors-like, but a substantial amount of such material is driven inwardly between the two edges until it reaches the innermost portion of the downstream edge of the supply opening, where it is cut by those edges. In the rotary feeder of the invention, the torque necessary to cut any material caught between the rotor radial elements and the supply opening is significantly reduced, thus enabling a lower-power motor to be used.

The radial elements of the rotor are, preferably, provided with blades adjacent that housing wall member through which the material enters the feeder. The difficulty of cutting through material caught between the rotor and housing member supply opening is thus further reduced. Heretofore, it has been suggested that a blade at the edge of the housing opening suffices; a blade at this location, however, has the harmful effect of catching material and blocking its entry into the feeder.

Another feature of the rotary feeder of the invention resides in forming the rotor in two sections, the rotor being divided into two sections along a plane substantially perpendicular to its axis of rotation. The sections are resiliently urged apart into engagement with the housing and, at the same time, are prevented from movement toward each other. Thus, as the contacting surfaces of the rotor and the housing wear, any gap tending to be created thereby is taken up by outward movement of the rotor sections. The sections are thus maintained in proper engagement with the housing and an efficient seal is provided. Nevertheless, because the two section cannot move toward each other, a build-up of intruding material cannot occur.

Figure 2:
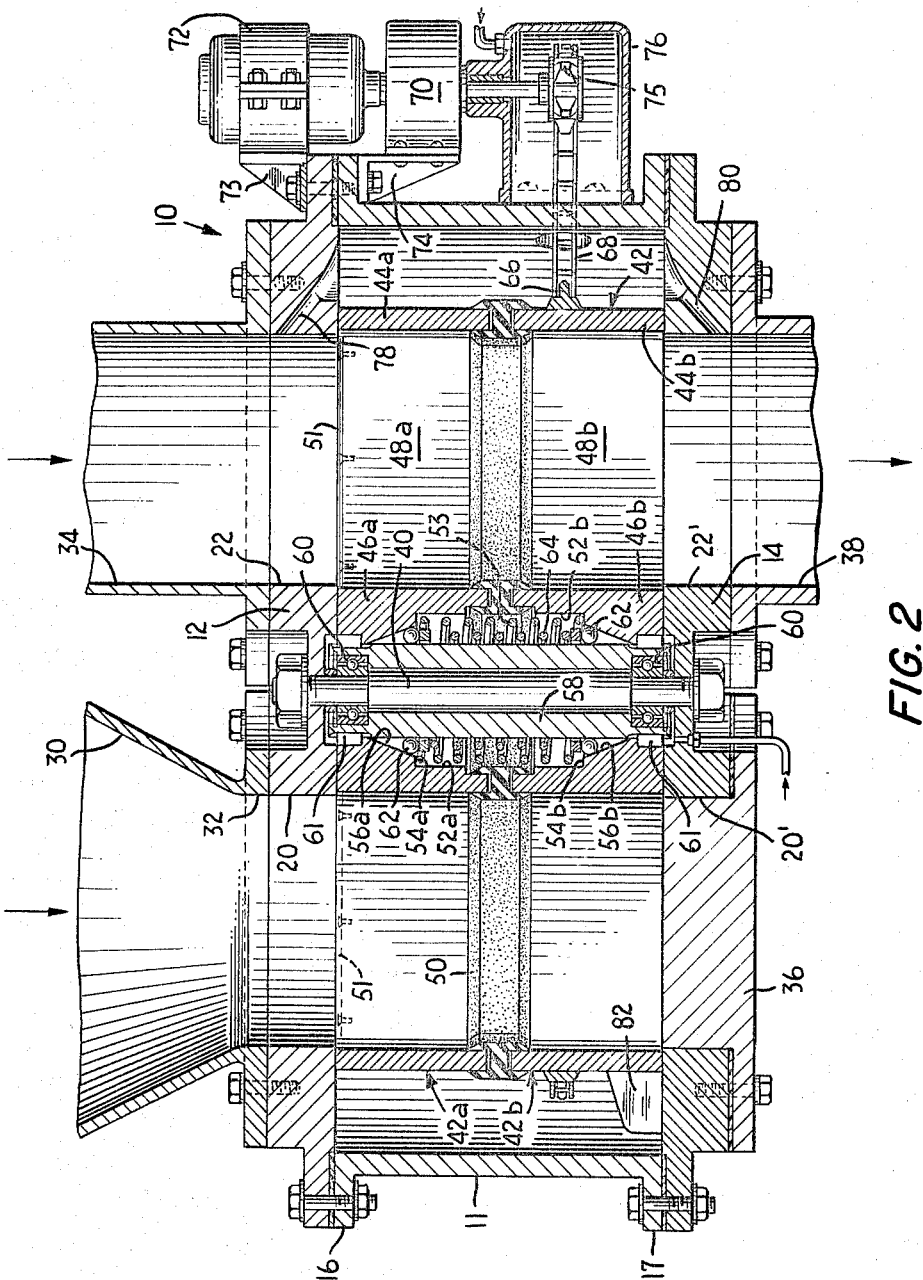

For a better understanding of the invention, reference may be made to the following description of an exemplary embodiment of the rotary feeder, taken in conjunction with the figures of the accompanying drawings, in which:

FIG. 1 is a top view of the embodiment, a material hopper and auxiliary conduits being removed for clearer illustration and portions of the housing being broken away to better show the interior parts; and FIG. 2 is a view in section of the rotary feeder taken generally along the line 2—2 of FIG. 1 and in the direction of the arrows.

The rotary feeder includes a housing 10 having a generally cylindrical body member 11 and upper and lower wall members 12 and 14 which are bolted to peripheral flanges 16 and 17 extending outwardly from the edges of the body.

In order to reduce the cost of manufacture and assembly of the feeder, the upper and lower wall members 12 and 14 of the housing are identical; accordingly, corresponding parts of the lower wall member of the housing are identified herein and designated in the drawings by the same reference numerals as those of the upper wall member, except for the addition of a prime (') suffix.

The wall members include two openings 20 and 22 of substantially the same size and shape, each comprising a substantially straight inner edge 20a, 22a, a downstream edge 20b, 22b and an upstream edge 20c, 22c. (The terms "downstream" and "upstream" are with reference to the direction of rotation of the feeder rotor, which will be described in detail hereinafter.) The downstream and upstream edges of the openings 20 and 22 are symmetrical with respect to centerlines lying in radial planes with respect to the axis of rotation of the rotor, and the centerlines of the openings are located 120° apart. Centered on a radial line 120° from the centerlines of the openings 20 and 22 is a circular opening 24 of relatively small size.

The opening 20 serves as a supply opening by which material in a hopper 30, of which only the lower portion is shown in FIG. 2, is introduced into the feeder. The hopper funnel conforms in shape to and is in register with the material supply opening 20. The opening 22 serves as either the inlet or outlet for the incoming conveying fluid or the outgoing fluid and material, and a coupling 34 for connecting a conduit to the opening 22 is bolted to the upper wall member 12 of the feeder. The opening 20' in the lower wall member 14 provides access to the lower portion of the hopper and is provided with a removable plug 36. The opening 22' serves as the inlet or outlet, as the case may be, for the conveying fluid, or fluid and material, and is provided with a coupling 38, which may be the same as the coupling 34. One of the circular openings 24 in the upper and lower plates serves as an exhaust port or vent for emptying the pockets of the rotor of any gaseous conveying fluid which would inhibit the introduction of material into them, and the other serves as an access for clean-out and is provided with a plug. When the conveying fluid is a liquid, it may be drained through the lower opening (not shown), or may be ejected through the lower opening by blowing air in through the upper opening 24.

Rotatably mounted within the housing 10 on a shaft 40 installed between the upper and lower members 12 and 14 is a rotor 42. In the illustrated embodiment, the rotor is formed in two substantially identical sections 42a and 42b which are disposed in opposed relation on opposite sides of a plane perpendicular to and bisecting the shaft 40. The upper and lower sections include, respectively, an annular peripheral wall 44a, 44b, an inner sleeve 46a, 46b and a plurality of substantially straight radial walls 48a, 48b of substantially uniform thickness extending radially between the outer wall and the sleeve. A gasket 50, having elements which are generally H-shaped in cross-section, is installed between the upper and lower sections. There is thus defined in the rotor 42 a plurality of generally "pie-shaped" material-receiving pockets. In the illustrated embodiment, each of the upper edges of the radial elements 48a of the rotor section 42a carries a blade 51 to facilitate cutting material caught at the downstream edge 20b of the supply opening 20 as the radial elements approach and pass it.

Referring to FIG. 2, the interior part of each of the rotor section sleeves 46a and 46b is provided with a recess 52a, 52b. A spring 53 engages shoulders 54a and 54b at the ends of the recesses 52a and 52b. Inwardly facing, fustro-conical wedge surfaces 56a, 56b are formed in the rotor sections 42a and 42b adjacent the recesses 52a and 52b. The rotor sections 42a and 42b are mounted to slide axially on a sleeve 58 which is carried on the shaft 40 by bearings 60, and keys 61 fix the rotor sections to the sleeve 58 for rotation therewith about the fixed shaft 40. Balls 62 are installed in the spaces between the sleeve 58 and the wedge surfaces and are resiliently urged into those spaces by a spring 64.

The above-described structure of the rotor enables it to automatically adjust and hold to the proper fit with the housing. The rotor sections 42a and 42b are urged apart and into engagement with the respective wall members 12 and 14. Any inward movement of the sections away from the wall members, such as might be caused by the intrusion of particles into the interface between them, is prevented by the wedging of the balls 42 into the space between the sleeve 58 and the wedge surfaces.

The rotor 42 carries a sprocket 66 and is driven through a chain 68 and a speed reducer 70 by a motor 72. The speed reducer 70 and motor 72 are mounted on the feeder housing 10 by brackets 73 and 74. The driving sprocket 75 and portion of the chain extending outside of the main housing body 12 are contained in a cover 76.

In operation, granular material contained in the hopper 30 falls by gravity, or is suitably propelled, into each pocket of the rotor 42 as it moves across the material supply opening. Rotation of the rotor 42 carries the filled pockets successively into alignment with the conveying fluid inlet opening 22 through which a conveying fluid is delivered. The material is carried by the conveying fluid out of the pockets and through the discharge opening 22'. After the material is removed, the pockets still contain a quantity of the conveying fluid. This is removed upon communication of the pockets with the vent opening 24, and they are returned to atmospheric pressure or are partially or fully evacuated, as required, thus being made ready for another charge of material.

With many materials it is possible that very fine particles may escape from within the rotor pockets into the chamber defined between the peripheral elements 44 of the rotor and the housing body 11. Accordingly, it is preferable to provide an inlet and outlet into and out of that chamber, such as orifices 78 and 80 formed in the upper and lower walls 12 and 14 of the housing, to provide a flow of conveying fluid therethrough. Further, a vane 82 is provided at the lower end of the peripheral element 44b of the rotor section 42b to prevent settlement of material on the bottom of the peripheral chamber and conduct it to the outlet orifice 80.

It is also desirable to establish pressures higher than that of any other part of the system in the chamber defined within the inner sleeve parts 46a and 46b of the rotor sections and within the cover 76 to prevent the passage of material into these regions.

The geometry of the material supply opening and its cooperation with the blades 51 on the leading edges of the rotor radial elements 48a enables the rotary feeder of the invention to operate at high efficiency. More particularly, there is a tendency for material to be trapped between the blades and the downstream edges of the opening as the blades pass across it. It will be observed that no matter what the angular position of the rotor is, an acute angle is defined between the downstream edge 20b of the opening 20 and the approaching blade on the radial element of the rotor. Accordingly, any material tending to be caught between the rotor blade and the edge 20b and not immediately sheared by the blade is forced along the edge 20b until it is caught at the corner defined between the inner edge 20a and the downstream edge 20b of the opening 20 where it is cut by the blade.

The engaging surfaces of the rotor and the wall members 12 and 14 of the housing are, of course, subject to wear. Accordingly, the construction of the rotor in two sections, which are urged outwardly into engagement with the members 12 and 14, automatically provides the proper fit with the members 12 and 14; moreover, the proper relation is maintained at all times, and the intrusion of material between the rotor and the wall members is substantially prevented.

It will be understood that the above-described embodiment of the invention is merely exemplary and that many modifications and variations thereof may be made by those skilled in the art without departing from the spirit and scope of the invention. All such modifications and variations are intended to be within the scope of the invention as defined in the appended claims.

I claim:

1. A rotary feeder comprising a housing having spaced-apart oppositely disposed wall members, the wall members having, respectively, a conveying fluid inlet opening and a discharge opening and one of the wall members having a material supply opening, a rotor rotatably mounted in the housing and having surfaces engaging the inner surfaces of the housing wall members, and means for rotating the rotor, the rotor including a peripheral element and a plurality of radial elements defining a plurality of material-receiving pockets movable in succession upon rotation of the rotor along a path which brings them into communication first with the material supply opening and then with the conveying fluid inlet opening and the discharge opening, the leading edges of the radial elements of the rotor and the downstream edge, with respect to the direction of rotation of the rotor, of the material supply opening being arranged relative to each other to urge any material engaged therebetween generally inwardly and to shear such material at a radially inward portion thereof, the wall member material supply opening being defined by an inwardly located edge and upstream and downstream edges, with respect to the direction of rotation of the rotor, the downstream edge including an inwardly located substantially straight portion intersecting the inner edge of the opening, and an inwardly facing concave outer curved portion meeting the outer portion of the upstream edge of the opening.

2. A rotary feeder according to claim 1 wherein the straight portion of the downstream edge of the supply opening is a substantial distance downstream, with respect to the direction of rotation of the rotor, of that radial plane through the axis of rotation of the rotor which is parallel thereto.

3. A rotary feeder according to claim 2 wherein the material supply opening is substantially symmetrical about the said radial plane.

4. A rotary feeder according to claim 3 wherein the outer curved portions of the upstream and downstream edges of the material supply opening are annular and are contiguous to each other.

5. A rotary feeder comprising a housing having oppositely disposed wall members, the wall members including, respectively, a conveying fluid inlet opening and a discharge opening substantially aligned with each other and one of the wall members having a material supply opening, a rotor rotatably mounted in the housing and having surfaces engaging the inner surfaces of the housing wall members, and means for rotating the rotor, the rotor including two sections on opposite sides of a plane substantially perpendicular to the axis of rotation of the rotor and means urging the sections into engagement with the respective adjacent housing wall member and preventing movement of the sections toward each other, and each of the sections including a peripheral element and a plurality of radial elements defining a plurality of material receiving pockets in the rotor, each of which is movable upon rotation of the rotor along a path which brings them into communication first with the material supply opening and then with the conveying fluid inlet opening and discharge opening.

6. A rotary feeder according to claim 5 wherein the rotor includes a rotatable central supporting member, the supporting member carrying the two sections for sliding movement thereon, and wherein the urging means comprises resilient means engaging opposed parts of the rotor sections and urging each of the sections toward the adjacent wall member, inwardly facing wedge surfaces on each rotor section adjacent the support member, and means urged into engagement with the wedge surfaces and with the support member and cooperative therewith to enable movement of the sections away from each other and prevent movement of the two sections toward each other.

7. A rotary feeder according to claim 5 wherein the means urging the two sections of the rotor into engagement with the housing wall member includes resilient means engaging opposed parts of the rotor sections and urging each of the sections toward the respective wall members and one-way clutch means associated with the rotor sections for preventing them from moving towards each other and out of engagement with the respective wall members.

8. A rotary feeder comprising a housing having oppositely disposed first and second wall members, the wall members having, respectively, a conveying fluid inlet opening and a discharge opening substantially aligned with each other and the first wall member having a material supply opening therein, a rotor rotatably mounted on the housing and having surfaces engaging the inner surfaces of the housing wall members, the rotor including an annular peripheral element, and drive means for rotating the rotor including a flexible member and means on the peripheral element cooperative with the flexible member, the rotor including a plurality of straight elements of substantially uniform thickness defining a plurality of material-receiving pockets movable in succession upon rotation of the rotor along a path which brings them into communication first with the material supply opening and then with the conveying fluid inlet opening and the discharge opening and the radial elements of the rotor carrying blades on the edges thereof adjacent the first housing wall member, the blades and the downstream edge, with respect to the direction of rotation of the rotor, of the material supply opening being shaped and disposed relative to and cooperative with each other to urge any material engaged therebetween generally inwardly along the blade and to shear such material in the region of an innermost portion of the said downstream edge of the supply opening.

9. A rotary feeder according to claim 8 wherein the second wall member has an access opening substantially aligned with the material supply opening, and a removable plug carried in the access opening.

10. A rotary feeder according to claim 8 wherein one of said first and second housing wall members has an exhaust port therein disposed between the material supply opening and conveying fluid inlet and discharge openings and positioned to successively communicate with each of the material receiving pockets of the rotor to vent conveying fluid therefrom, and the other wall member has an exhaust port access opening disposed substantially in alignment with the exhaust port and a removable plug disposed in the access opening.

11. A rotary feeder according to claim 8 wherein a peripheral chamber is defined between the housing and the peripheral element of the rotor, inlet and outlet means are provided for passing conveying fluid into and out of the peripheral chamber and vane means is provided on the rotor for impelling any material in the peripheral chamber into the region of the peripheral chamber outlet means.

12. A rotary feeder comprising a housing having oppositely disposed wall members, the wall members including, respectively, a conveying fluid inlet opening and a discharge opening and one of the wall members having a material supply opening, a rotor rotatably mounted in the housing and having surfaces engaging the inner surfaces of the housing wall members, the rotor including a plurality of material receiving pockets therein, and means for rotating the rotor so as to move said plurality of material receiving pockets along a path which brings them into communication first with the material supply opening and then with the conveying fluid inlet opening and the discharge opening, the rotor being constructed in two sections and mounted between the wall members so as to be movable relative to each other into engagement with the opposite wall members and the rotor including means urging the sections into engagement with the respective housing wall members, and means for preventing movement of the sections toward each other and out of engagement with the housing wall members.

13. A rotary feeder according to claim 12 wherein the rotor includes a shaft and wherein the means for preventing movement of the rotor sections toward each other includes means defining a wedge-shaped space between each rotor section and the shaft, and means in said spaces urged into jamming engagement between the shaft and each rotor section and cooperative therewith to enable movement of the sections away from each other and prevent movement of the sections toward each other.

References Cited by the Examiner

UNITED STATES PATENTS

| 1,771,497 | 7/1930 | Mayr | 302—49 |
| 1,772,290 | 8/1930 | Rosencrants | 302—49 |
| 2,680,683 | 5/1954 | Obenshain | 302—49 |
| 2,757,049 | 7/1956 | Temple | 302—49 |
| 2,766,911 | 10/1956 | Greaves et al. | 302—49 |
| 2,852,315 | 9/1958 | Lenhart | 302—49 |

ANDRES H. NIELSEN, *Primary Examiner.*